(12) United States Patent
Wang et al.

(10) Patent No.: US 12,427,498 B2
(45) Date of Patent: Sep. 30, 2025

(54) FLOATABLE HOLLOW MICROSPHERE MATERIAL, AND PREPARATION METHOD AND USE IN SOIL CADMIUM REDUCTION THEREOF

(71) Applicant: Institute of Soil Science, CAS, Nanjing (CN)

(72) Inventors: Xingxiang Wang, Nanjing (CN); Yurong Wang, Nanjing (CN); Changfeng Ding, Nanjing (CN); Ziyao Li, Nanjing (CN); Liqin He, Nanjing (CN)

(73) Assignee: Institute of Soil Science, CAS, Nanjing (CN)

( * ) Notice: Subject to any disclaimer, the term of this patent is extended or adjusted under 35 U.S.C. 154(b) by 73 days.

(21) Appl. No.: 18/609,383

(22) Filed: Mar. 19, 2024

(65) Prior Publication Data

US 2025/0161907 A1 May 22, 2025

(30) Foreign Application Priority Data

Nov. 17, 2023 (CN) .......................... 202311531957.4

(51) Int. Cl.
*B01J 20/22* (2006.01)
*B01J 20/12* (2006.01)
*B01J 20/24* (2006.01)
*B01J 20/28* (2006.01)
(Continued)

(52) U.S. Cl.
CPC ............. *B01J 20/223* (2013.01); *B01J 20/12* (2013.01); *B01J 20/24* (2013.01); *B01J 20/28004* (2013.01); *B01J 20/28011* (2013.01); *B01J 20/28021* (2013.01); *B01J 20/2803* (2013.01);
(Continued)

(58) Field of Classification Search
CPC . B01J 20/223; B01J 20/12; B01J 20/24; B01J 20/28004; B01J 20/28011; B01J 20/28021; B01J 20/2803; B01J 20/3042; B01J 20/3085; B09C 1/08
See application file for complete search history.

(56) References Cited

U.S. PATENT DOCUMENTS

| | | | |
|---|---|---|---|
| 2018/0250656 A1* | 9/2018 | Mishra | ............... B01J 20/28004 |
| 2023/0219055 A1* | 7/2023 | Li | ............................. B09C 1/08 |
| | | | 210/208 |

FOREIGN PATENT DOCUMENTS

| | | | | |
|---|---|---|---|---|
| CN | 108018046 A | * | 5/2018 | ............... B09C 1/08 |
| JP | 2013166090 A | * | 8/2013 | ........... B01J 20/3007 |

* cited by examiner

*Primary Examiner* — Kyle Armstrong
(74) *Attorney, Agent, or Firm* — Young Basile Hanlon & MacFarlane, P.C.

(57) ABSTRACT

Disclosed are a floatable three-dimensional (3D) hollow microsphere material, and its preparation method and use in soil cadmium reduction, belonging to the field of regeneration of contaminated soil. The preparation method includes: mixing polyvinyl alcohol, sodium alginate, ethylenediaminetetraacetic acid, saponin, and at least one of modified rectorite and unmodified rectorite, to obtain a mixed material, wherein the modified rectorite includes at least one of formamide-modified rectorite and sodium humate-modified rectorite; and mixing the mixed material with a cross-linking agent solution, and performing cross-linking on a resulting mixture to obtain the floatable 3D hollow microsphere material. The floatable 3D hollow microsphere material is applied to moist soil to adsorb and remove heavy metal elements.

13 Claims, 7 Drawing Sheets

(51) Int. Cl.
*B01J 20/30* (2006.01)
*B09C 1/08* (2006.01)
(52) U.S. Cl.
CPC ....... *B01J 20/3042* (2013.01); *B01J 20/3085* (2013.01); *B09C 1/08* (2013.01)

FLOATABLE HOLLOW MICROSPHERE MATERIAL, AND PREPARATION METHOD AND USE IN SOIL CADMIUM REDUCTION THEREOF

CROSS REFERENCE TO RELATED APPLICATION

This patent application claims the benefit and priority of Chinese Patent Application No. 202311531957.4 filed with the China National Intellectual Property Administration on Nov. 17, 2023, the disclosure of which is incorporated by reference herein in its entirety as part of the present application.

TECHNICAL FIELD

The present disclosure belongs to the field of regeneration of contaminated soil, and specifically relates to a floatable hollow microsphere material, and a preparation method and use in soil cadmium reduction thereof.

BACKGROUND

At present, soil pollution of cultivated land in China mainly lies in those slightly exceeding the standard, among which soil contaminated by inorganic pollutant(s) represented by heavy metal elements accounts for 82.8%. Excessive heavy metals in soil have become one of the important reasons restricting quality safety of agricultural products in China. Therefore, the management and safe utilization of farmland contaminated by heavy metal elements are issues that need to be solved urgently.

The remediation and safe utilization of heavy metal-contaminated farmland has its own unique requirements. The remediation technology should be rapid and efficient, and could not degrade soil structure and production functions, otherwise the growth of crops may be impeded. In view of this, it is crucial to develop materials and technologies for rapid removal of heavy metal elements from soil.

Currently, existing heavy metal remediation technologies for farmland soil are mainly divided into heavy metal immobilization and cleanup. The heavy metal immobilization in soil requires periodic application of immobilization materials, which reduce bioavailability of the heavy metal elements but could not reduce the total content of heavy metal elements in the soil. For the total removal, soil remediation technologies could reduce the total content of heavy metal elements in soil and cleanup heavy metal elements from soil, and mainly includes phytoremediation and leaching technologies. The phytoremediation has a long cycle, shows seasonal conflicts with crop production, especially rice production, and may affect crop production when being applied on a large scale. The leaching technology generally requires adding a material to activate the heavy metal elements, which could result in high cost and difficulty in recovering a resulting leachate. Moreover, the leaching technology may also destroy the structure and functions of soil, making it difficult to meet the demands of remediation and regeneration of large-area heavy metal-contaminated soil.

SUMMARY

An object of the present disclosure is to provide a floatable hollow microsphere material, and a preparation method and use thereof in soil cadmium reduction. In the present disclosure, the floatable three-dimensional (3D) hollow microsphere material could effectively reduce total content of heavy metal elements in the soil without affecting normal farming operations. The material can be applied and recycled easily, effectively reduces the cost of remediating heavy metal-contaminated soil, and can meet the demands of remediation and regeneration of large-area heavy metal-contaminated soil.

To achieve the above object, the present disclosure provides the following technical solutions.

Provided is a method for preparing a floatable 3D hollow microsphere material, including the following steps:
mixing polyvinyl alcohol (PVA), sodium alginate, ethylenediaminetetraacetic acid (EDTA), saponin, and at least one of modified rectorite and unmodified rectorite, to obtain a mixed material, wherein the modified rectorite includes at least one selected from the group consisting of formamide-modified rectorite and sodium humate-modified rectorite; and
mixing the mixed material with a cross-linking agent solution, and performing cross-linking on a resulting mixture, to obtain the floatable 3D hollow microsphere material.

In some embodiments, the modified rectorite is prepared by a process including
mixing rectorite with a modifier solution, and performing modification, to obtain the modified rectorite, wherein the modifier solution includes a formamide solution or a sodium humate solution.

In some embodiments, the rectorite has a particle size of less than or equal to 0.149 mm.

In some embodiments, the formamide solution has a formamide mass percentage of 20% to 25%; and under the condition that the modifier solution is the formamide solution, a ratio of a mass of the rectorite to a volume of the formamide solution is in a range of (1-2) g:10 mL.

In some embodiments, the sodium humate solution has a sodium humate mass concentration of 8 g/L to 10 g/L; and under the condition that the modifier solution is the sodium humate solution, a ratio of a mass of the rectorite to a volume of the sodium humate solution is in a range of (1-2) g:20 mL.

In some embodiments, a mass ratio of the PVA, the sodium alginate, at least one of the modified rectorite and the unmodified rectorite, the EDTA, and the saponin is in a range of (175-225):(2-10):(50-125):(1-5):(5-20).

In some embodiments, the cross-linking agent solution includes boric acid, calcium chloride, and water; the cross-linking agent solution has a boric acid mass concentration of 36.5 g/L, and a calcium chloride mass concentration of 10 g/L; and a mass ratio of the mixed material to the cross-linking agent solution is in a range of (46-77):(1035-1055).

The present disclosure further provides a floatable 3D hollow microsphere material prepared by the method as described in above technical solutions, including a hollow cross-linked polymer microsphere obtained by cross-linking the PVA with the sodium alginate; and the EDTA, the saponin, and at least one of the modified rectorite and the unmodified rectorite that are loaded inside the hollow cross-linked polymer microsphere, wherein the modified rectorite includes at least one of the formamide-modified rectorite and the sodium humate-modified rectorite.

In some embodiments, the floatable 3D hollow microsphere material has a diameter of 2 mm to 10 mm, and a density of 0.45 g/cm$^3$ to 0.50 g/cm$^3$.

The present disclosure further provides use of the floatable 3D hollow microsphere material as described in above technical solutions in removing heavy metal elements.

The present disclosure provides a method for preparing a floatable 3D hollow microsphere material, including the following steps: mixing PVA, sodium alginate, EDTA, saponin, and at least one of modified rectorite and unmodified rectorite, to obtain a mixed material, wherein the modified rectorite includes at least one of formamide-modified rectorite and sodium humate-modified rectorite; and mixing the mixed material with a cross-linking agent solution, and performing cross-linking on a resulting mixture, to obtain the floatable 3D hollow microsphere material. In the present disclosure, the PVA and the sodium alginate undergo cross-linking under the action of a cross-linking agent to form a hollow 3D network structure. While the cross-linking occurs, the EDTA, the saponin, and at least one of the modified rectorite and the unmodified rectorite are loaded inside the hollow 3D network structure, thereby obtaining a multi-material-loaded floatable 3D hollow adsorbent material. Rectorite is an aluminosilicate mineral with a special structure, as well as an interstratified clay mineral composed of dioctahedral mica and dioctahedral montmorillonite regularly arranged in a manner of 1:1. The rectorite has swellability, adsorbability, and cation exchange properties, and contains hydrated cations between layers, resulting in that it could be easily modified by intercalations. The unmodified rectorite, formamide-modified rectorite, and sodium humate-modified rectorite are used as raw materials (after modification with formamide or sodium humate, an interlayer spacing of the rectorite is increased, thus increasing a cation exchange capacity; meanwhile, the formamide or sodium humate could be loaded on a surface of rectorite to provide a large number of carbonyl and amido groups). EDTA and saponin are both important chelating agents, and adding the EDTA and saponin to microspheres could improve a complexing effect on heavy metal ions such as cadmium. The microsphere cross-linked PVA-sodium alginate contains abundant hydroxyl and carboxyl groups, which provide a large number of sites for the adsorption of heavy metal ions such as cadmium ion. Further, the PVA and sodium alginate are used to prepare a cross-linked polymer, which improves a hydrophilicity of the material, facilitates the collection of materials, and removal thereof together with heavy metal elements from the farmland soil. In summary, the floatable 3D hollow microsphere material could effectively reduce a total content of heavy metal elements in the soil without disturbing normal farming operations. The material can be applied and recycled easily, which effectively reduces the cost of heavy metal-contaminated soil remediation.

The present disclosure further provides a floatable 3D hollow microsphere material prepared by the method as described in above technical solutions, including a hollow cross-linked polymer microsphere obtained by cross-linking the PVA with the sodium alginate; and the EDTA, the saponin, and at least one of the modified rectorite and the unmodified rectorite that are loaded inside the hollow cross-linked polymer microsphere, wherein the modified rectorite includes at least one of the formamide-modified rectorite and the sodium humate-modified rectorite. The floatable 3D hollow microsphere material is applied to soil when the soil is moist to adsorb heavy metal elements. After floating the microsphere material by pouring water to field, microsphere material floated is directly recovered using a filter, or collected using a filter screen set at a drainage outlet, and then removed from the soil. The floatable 3D hollow microsphere material is an efficient and floatable heavy metal adsorbent. The material is also a three-dimensional material that could efficiently absorb and remove heavy metal elements from soil such as cadmium with less expense and a short time limit.

BRIEF DESCRIPTION OF THE DRAWINGS

FIGS. 2A and 2B show scanning electron microscope (SEM) images of rectorite in the present disclosure, in which.

FIGS. 3A and 3B show SEM images of a floatable 3D hollow microsphere material prepared in the present disclosure, in which.

FIGS. 5A and 5B show schematic diagrams of a floatable 3D hollow microsphere material prepared in the present disclosure in a water floating experiment, in which.

FIGS. 6A and 6B show a comparison before and after pouring water when the floatable 3D hollow microsphere material prepared in the present disclosure is applied to soil, in which.

DETAILED DESCRIPTION

The present disclosure provides a method for a floatable 3D hollow microsphere material, including the following steps:
  mixing PVA, sodium alginate, EDTA, and saponin, and at least one of modified rectorite and unmodified rectorite, to obtain a mixed material, wherein the modified rectorite includes at least one of formamide-modified rectorite and sodium humate-modified rectorite; and
  mixing the mixed material with a cross-linking agent solution, and performing cross-linking on a resulting mixture, to obtain the floatable 3D hollow microsphere material.

In the present disclosure, unless otherwise specified, all raw materials for preparation are commercially available products well known to those skilled in the art.

In the present disclosure, PVA, sodium alginate, at least one of modified rectorite and unmodified rectorite, EDTA, and saponin are mixed to obtain a mixed material, wherein the modified rectorite includes at least one of formamide-modified rectorite and sodium humate-modified rectorite.

In some embodiments of the present disclosure, the formamide-modified rectorite has a formamide mass content of 0.5% to 1.5%. In some embodiments, the sodium humate-modified rectorite has a sodium humate mass content of 0.5% to 1.5%.

In some embodiments of the present disclosure, the modified rectorite is prepared by a process including the following steps:

mixing rectorite with a modifier solution, and performing modification to obtain the modified rectorite, wherein the modifier solution includes a formamide solution or a sodium humate solution. In some embodiments, the rectorite has a particle size less than or equal to 0.149 mm. In some embodiments, the formamide solution is an aqueous solution of formamide. In some embodiments, the aqueous solution of formamide has a formamide mass percentage of 20% to 25%, and preferably 23%. In some embodiments, under the condition that the modifier solution is the formamide solution, a ratio of a mass of the rectorite to a volume of the formamide solution is in a range of (1-2) g:10 mL, and preferably 1 g:10 mL. In some embodiments, the sodium humate solution is an aqueous solution of sodium humate. In some embodiments, the aqueous solution of sodium humate has a sodium humate mass concentration of 8 g/L to 10 g/L, and preferably 8 g/L. In some embodiments, under the condition that the modifier solution is the sodium humate solution, a ratio of a mass of the rectorite to a volume of the sodium humate solution is in a range of (1-2) g:20 mL, and preferably 1 g:20 mL. In some embodiments, the modification is conducted at a temperature of 65° C. to 70° C. In some embodiments, the modification is conducted for 0.5 h to 1 h. In some embodiments, the modification is conducted under stirring. After the modification is completed, a modified mixture is obtained. In some embodiments, a solid product in the modified mixture is washed with water and then dried to obtain the modified rectorite. In some embodiments, the washing is conducted with deionized water. In some embodiments, the washing with water is conducted three times. In some embodiments, the washing with water is conducted by centrifugal washing. In some embodiments, the drying is conducted at 60° C. In some embodiments, the drying is conducted in an oven.

In some embodiments of the present disclosure, under the condition that the mixed raw materials include a mixture of the modified rectorite and ordinary rectorite (i.e., the unmodified rectorite), there is no special requirement on a mass ratio of the modified rectorite to the ordinary rectorite.

In some embodiments of the present disclosure, a mass ratio of the PVA, the sodium alginate, at least one of the modified rectorite and the unmodified rectorite, the EDTA, and the saponin is in a range of (175-225):(2-10):(50-125):(1-5):(5-20), and preferably 40:0.9:18:0.3:2. In some embodiments, the mixing includes: heating and dissolving the PVA and the sodium alginate to obtain a cross-linking monomer solution; and mixing the cross-linking monomer solution, at least one of the modified rectorite and the unmodified rectorite, the EDTA, and the saponin by stirring to obtain the mixed material. In some embodiments, the heating and dissolving is conducted at 100° C., for example in a water bath at 100° C. In some embodiments, the cross-linking monomer solution, at least one of the modified rectorite and the unmodified rectorite, the EDTA, and the saponin are mixed by stirring at 90° C. The mixed material is a viscous solution.

In the present disclosure, the mixed material is mixed with a cross-linking agent solution, and a resulting mixture is subjected to cross-linking to obtain the floatable 3D hollow microsphere material. In some embodiments, the cross-linking agent solution includes boric acid, calcium chloride, and water. In some embodiments, the cross-linking agent solution has a boric acid mass concentration of 30 g/L to 40 g/L, and preferably 36.5 g/L. In some embodiments, the cross-linking agent solution has a calcium chloride mass concentration of 5 g/L to 15 g/L, and preferably 10 g/L. In some embodiments, a mass ratio of the mixed material to the cross-linking agent solution is in a range of (46-77):(1035-1055), and preferably 61:1047. In some embodiments, the mixing of the mixed material and the cross-linking agent solution includes adding the mixed material into the cross-linking agent solution by injection or dropwise addition. In some embodiments, the injection is conducted using an injection device. In some embodiments, the dropwise addition is conducted using a titration device or the injection device. In some embodiments, the mixed material is injected at a rate of 1 g/min to 2 g/min. In some embodiments, the mixed material is added at 1 g/min. In some embodiments, the cross-linking is conducted at room temperature. In some embodiments, after the cross-linking is completed, a resulting reaction system obtained from the cross-linking reaction is left to stand, to obtain a solid product; the solid product is washed with water and then dried to obtain the floatable 3D hollow microsphere material. In some embodiments, the washing with water is conducted 3 times. In some embodiments, the drying is conducted at 50° C. In some embodiments, the drying is performed by oven drying or vacuum drying.

In some embodiments of the present disclosure, the method further includes, after completing the cross-linking and obtaining a solid product (the floatable 3D hollow microsphere material), immersing the floatable 3D hollow microsphere material in water, and performing ultrasonic modification, to obtain an ultrasonically-modified floatable 3D hollow microsphere material. In some embodiments, the water is deionized water. In some embodiments, a material-to-liquid ratio of the solid product to the water is 1 g:10 mL. In some embodiments, the ultrasonic modification is conducted at a frequency of 10 kHz to 50 kHz, and preferably 20 KHz. In some embodiments, the ultrasonic modification is conducted at room temperature. In some embodiments, the ultrasonic modification is conducted for 20 min to 60 min, and preferably 30 min.

The present disclosure further provides a floatable 3D hollow microsphere material prepared by the method as described in above technical solutions, including a hollow cross-linked polymer microsphere obtained by cross-linking the PVA with the sodium alginate; and at least one of the modified rectorite and the unmodified rectorite, the EDTA, and the saponin that are loaded inside the hollow cross-linked polymer microsphere, wherein the modified rectorite includes at least one of the formamide-modified rectorite and the sodium humate-modified rectorite.

In some embodiments of the present disclosure, the floatable 3D hollow microsphere material has a diameter of 2 mm to 10 mm, and preferably 5 mm to 8 mm. In some embodiments, the floatable 3D hollow microsphere material has a density of 0.45 g/cm$^3$ to 0.5 g/cm$^3$.

The present disclosure further provides use of the floatable 3D hollow microsphere material as described in above technical solutions in removing a heavy metal element.

In some embodiments of the present disclosure, the floatable 3D hollow microsphere material is used to remove heavy metal elements in soil or to remove heavy metal elements in water body. The water body includes wastewater or farmland irrigation water.

In some embodiments of the present disclosure, when the floatable 3D hollow microsphere material is used to remove heavy metal element(s) in soil, the use includes the following steps: applying the floatable 3D hollow microsphere material into moist soil to adsorb heavy metal element(s), pouring water into the moist soil to float the floatable 3D hollow microsphere material after absorbing heavy metal element(s), and removing the floatable 3D hollow microsphere material from the soil.

In some embodiments, the moist soil, in terms of dry soil, has a total cadmium content of 0.5 mg/kg to 2.8 mg/kg, specifically preferably 0.56 mg/kg, 1.49 mg/kg, or 2.77 mg/kg; and a 0.01 M calcium chloride-extractable cadmium (available cadmium) content of 0.1 mg/kg to 0.4 mg/kg, and specifically preferably 0.112 mg/kg, 0.271 mg/kg, or 0.392 mg/kg. In some embodiments, the moist soil has a moisture content of 30% to 70%, and preferably 40% to 67%. In some embodiments, the moist soil has a pH value of 5.3 to 5.6. In some embodiments, the floatable 3D hollow microsphere material is used in an amount of 500 kg/mu to 1,500 kg/mu (1 mu≈666.7 m2), and specifically preferably 500 kg/mu, 1,000 kg/mu, or 1,500 kg/mu. In some embodiments, adsorbing heavy metal element(s) is performed for 4 h to 24 h, and specifically preferably 4 h, 12 h, or 24 h. Before the application, the floatable 3D hollow microsphere material is a floatable 3D hollow microsphere material without ultrasonic modification and/or an ultrasound-modified floatable 3D hollow microsphere material. In some embodiments, the ultrasonic modification includes: immersing the floatable 3D hollow microsphere material without ultrasonic modification in water, and performing ultrasonic modification to obtain the ultrasonically-modified floatable 3D hollow microsphere material. In some embodiments, the water is deionized water. In some embodiments, a material-to-liquid ratio of the floatable 3D hollow microsphere material without ultrasonic modification to the water is 1 g:10 mL. In some embodiments, the ultrasonic modification is conducted at a frequency of 10 kHz to 50 kHz, and preferably 20 kHz. In some embodiments, the ultrasonic modification is conducted at room temperature. In some embodiments, the ultrasonic modification is conducted for 20 min to 60 min, and preferably 30 min. In some embodiments, the heavy-metal adsorption performance of the floatable 3D hollow microsphere material is improved by ultrasonic modification. The ultrasonic modification could make the pore distribution in the microspheres more uniform, and provide more surface area for loading the modified rectorite and/or unmodified rectorite, EDTA, and saponin dispersed inside the material. This results in increased adsorption sites for the heavy metal elements such as cadmium, thereby further improving an adsorption performance for the heavy metal element(s).

In some embodiments of the present disclosure, the application is conducted by stirring or rotary tillage. The floatable 3D hollow microsphere material could be evenly mixed with the moist soil by the stirring application or rotary tillage application. After pouring water, the floatable 3D hollow microsphere material could float. In some embodiments, the floatable 3D hollow microsphere material that has absorbed heavy metal elements is collected directly in the field with a filter or by setting up a filter at a drainage outlet, and removed from the soil. In some embodiments, the floatable 3D hollow microsphere material could be reused not less once, specifically preferably 1, 2, or 3 times.

In the present disclosure, an efficient and floatable heavy-metal adsorption material (the floatable 3D hollow microsphere material) is prepared. As a three-dimensional material, the material could efficiently absorb heavy metal elements in the soil and remove heavy metal elements such as cadmium from the soil with less expense and a short time limit.

To further illustrate the present disclosure, the technical solutions according to the present disclosure are described in detail below in conjunction with examples, but these examples should not be construed as limiting the claimed scope of the present disclosure.

Example 1

40 g of PVA and 0.9 g of sodium alginate were completely dissolved in a 100° C. water bath. After cooling slightly, 18 g of rectorite, 0.3 g of EDTA, and 2 g of saponin were then added thereto, and the resulting mixture was stirred evenly, obtaining a viscous mixed solution. The viscous mixed solution was slowly added dropwise using an injection device (at a dripping rate of 1 g/min) into a boric acid/calcium chloride solution (the boric acid/calcium chloride solution was an aqueous solution of boric acid and calcium chloride, in which the boric acid was saturated (i.e., 36.5 g/L), and a mass content of the calcium chloride was 10 g/L) to prepare a hollow microsphere. After leaving a resulting system to stand, a solid product was obtained, which was then washed, and dried at 50° C., obtaining a rectorite floatable 3D hollow microsphere.

Example 2

Figure 2A:
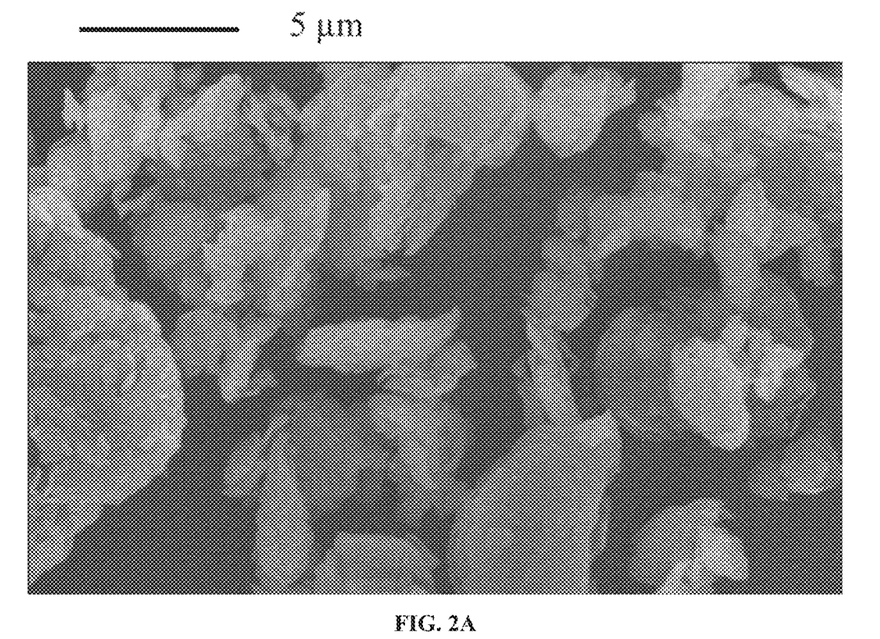
FIG. 2A is an SEM image with a magnification of ×5000.
Figure 2B:
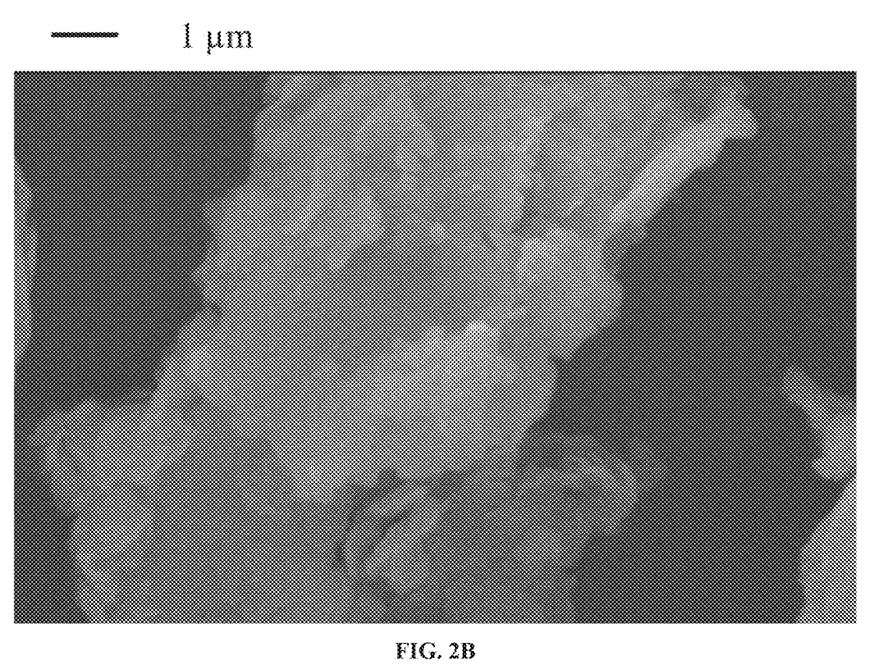
FIG. 2B is an SEM image with a magnification of ×10000.

50 g of rectorite (FIGS. 2A and 2B show SEM images of rectorite, wherein FIG. 2A is an SEM image with a magnification of ×5000, and FIG. 2B is an SEM image with a magnification of ×10000) was added to 500 mL of a formamide solution (23%), and then stirred at 65° C. for 0.5 h; an obtained complex was washed with deionized water 3 times by centrifugation, and then dried at 60° C. for 24 h, obtaining formamide-modified rectorite.

Figure 1:
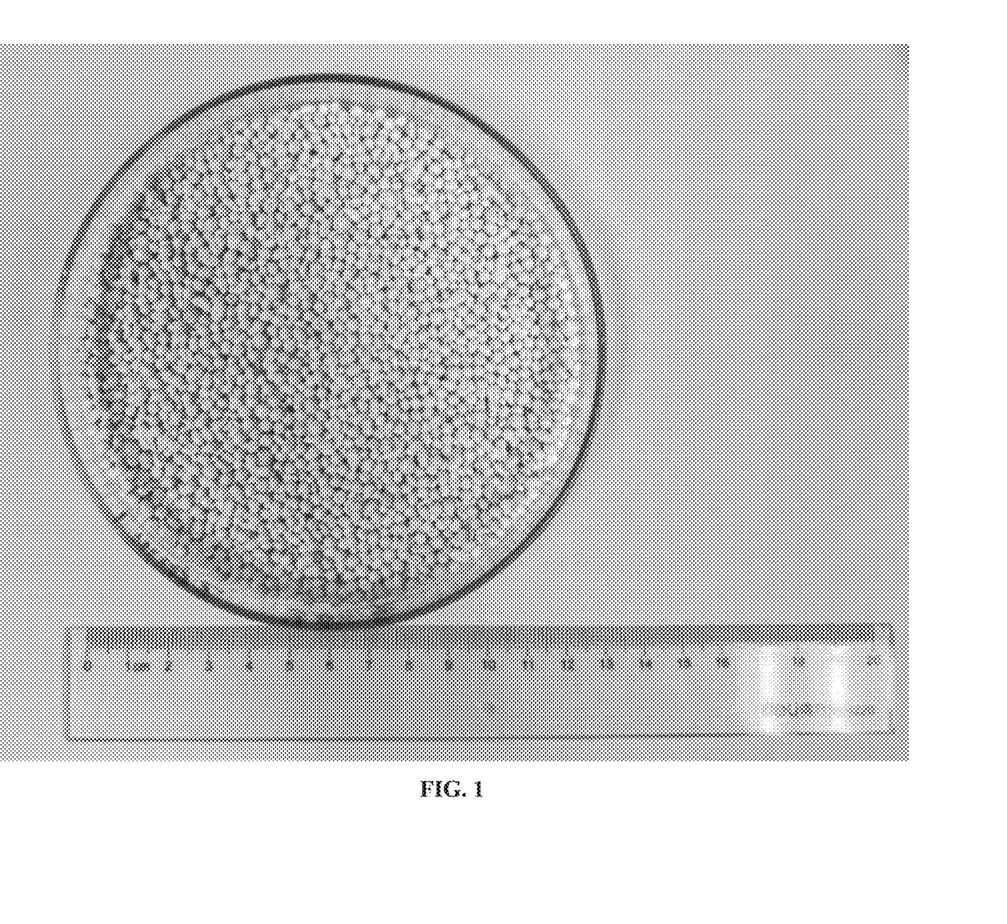
FIG. 1 shows a physical picture of the floatable 3D hollow microsphere material prepared in Example 2 of the present disclosure.
Figure 3A:
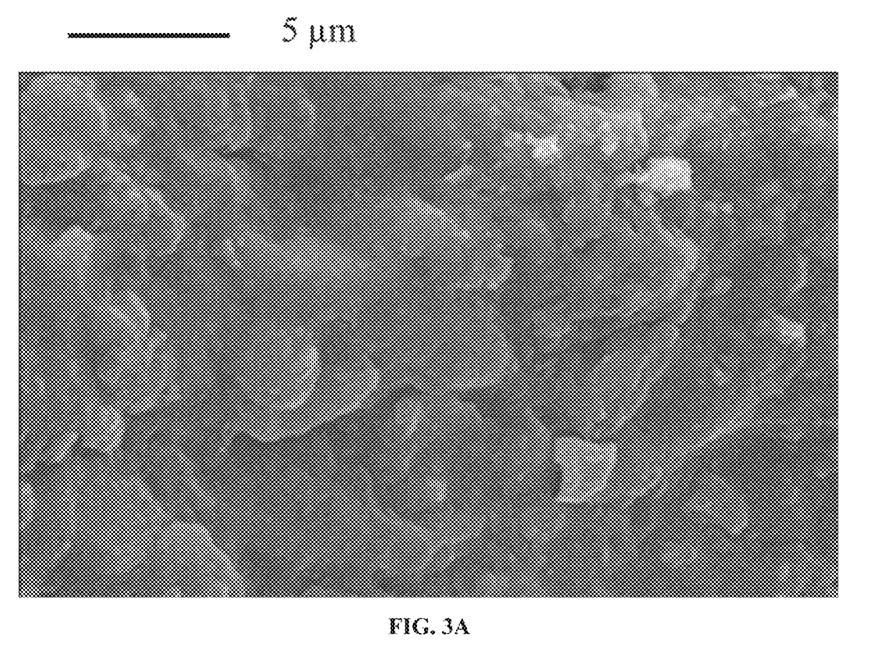
FIG. 3A is an SEM image with a magnification of ×5000.
Figure 3B:
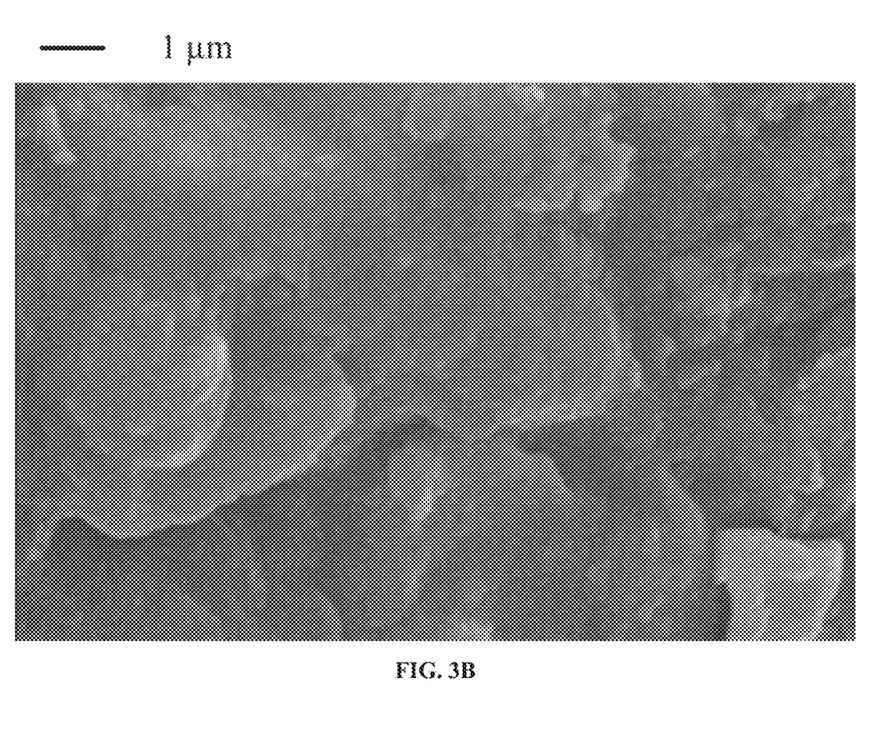
FIG. 3B is an SEM image with a magnification of ×10000.
Figures 4, 5A:
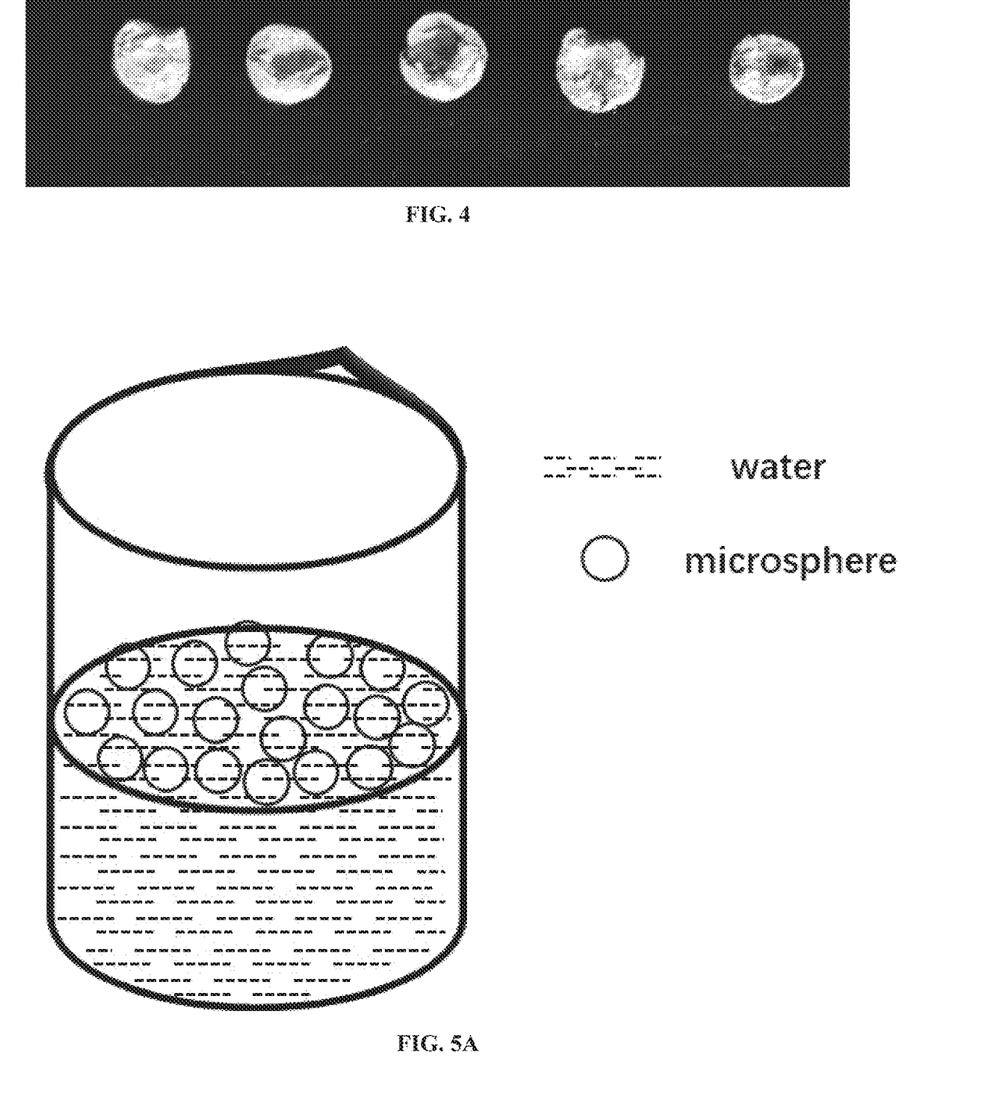
FIG. 4 shows a cross-sectional view of a floatable 3D hollow microsphere material prepared in an embodiment of the present disclosure.
FIG. 5A shows a top view of the floating.
Figure 5B:
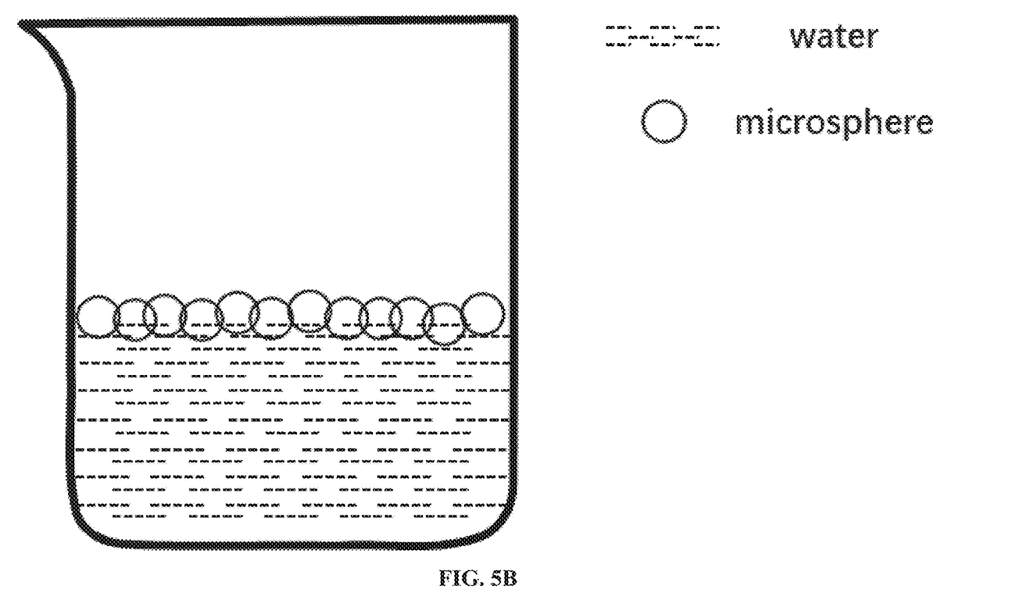
FIG. 5B shows a front view of the floating.

40 g of PVA and 0.9 g of sodium alginate were completely dissolved in a 100° C. water bath. After cooling slightly, 18 g of the formamide-modified rectorite, 0.3 g of EDTA, and 2 g of saponin were added thereto, and the resulting mixture was stirred evenly, obtaining a viscous mixed solution. The viscous mixed solution was slowly added dropwise using an injection device (at a dripping rate of 1 g/min) into a boric acid/calcium chloride solution (the boric acid/calcium chloride solution was an aqueous solution of boric acid and calcium chloride, in which the boric acid was saturated (i.e., 36.5 g/L), and a mass content of the calcium chloride was 10 g/L) to prepare a hollow microsphere. After leaving a resulting system to stand, a solid product was obtained, which was then washed, and dried at 50° C., obtaining a formamide-modified rectorite floatable 3D hollow microsphere. FIG. 1 shows a physical picture of the floatable 3D hollow microsphere material prepared in Example 2. FIGS. 3A and 3B show SEM images of the floatable 3D hollow microsphere material prepared in Example 2, wherein FIG. 3A is an SEM image with a magnification of ×5000, and FIG. 3B is an SEM image with a magnification of ×10000. FIG. 4 shows a cross-sectional view of a floatable 3D hollow microsphere material prepared in an embodiment of the present disclosure. As shown in FIG. 4, the floatable 3D hollow microsphere material prepared in this example has a hollow structure. FIGS. 5A and 5B show schematic diagrams of the floatable 3D hollow microsphere material prepared in Example 2 in a water floating experiment.

Use Example 1

(1) Use and Recycle of the Floatable 3D Hollow Microsphere Material 100 g of cadmium-contaminated dry soil (including total cadmium of 2.77 mg/kg and the available cadmium content of 0.392 mg/kg) was added into 50 mL of deionized water, and a resulting mixture was stirred evenly. 0.63 g of the floatable 3D hollow microsphere material prepared in Example 1 or Example 2 was added thereto, and a resulting system was stirred thoroughly, and the resulting system was left to stand for different times to allow the material to absorb heavy metal elements. 45 mL of deionized water was then added thereto, followed by stirring. The material floating on the water surface was recovered through a filter and a recovery efficiency was calculated.

(2) Removal Effect of the Floatable 3D Hollow Microsphere Material on Cadmium in Soil The soil was collected at 24 h after applying the floatable 3D hollow microsphere material prepared in Example 1 or 2, and the available cadmium content test was performed thereon. A removal effect of the floatable 3D hollow microsphere material on available cadmium in the soil was evaluated by comparing with a soil sample without the floatable 3D hollow microsphere material.

A concentration of available cadmium in the soil was measured using an inductively coupled plasma-mass spectrometer (ICP-MS).

TABLE 1

Materials of Examples 1 to 2

| No. | Material |
|---|---|
| Example 1 | Rectorite floatable 3D hollow microsphere material |
| Example 2 | Formamide-modified rectorite floatable 3D hollow microsphere material |

TABLE 2

Removal efficiency of available cadmium in soil by materials of Examples 1 to 2

| No. | Available cadmium content in soil after remediation (mg/kg) | Removal efficiency (%) |
|---|---|---|
| Example 1 | 0.229 | 41.6 |
| Example 2 | 0.162 | 58.7 |

The recovery efficiencies of the materials prepared in Examples 1 to 2 were 98.2% to 99.1% after applying for a period of time. After applying the rectorite floatable 3D hollow microsphere prepared in Example 1, the available cadmium in the soil was reduced to 0.229 mg/kg, showing a removal efficiency of 41.6%. After applying the formamide-modified rectorite floatable 3D hollow microsphere prepared in Example 2 under the same condition, the available cadmium in the soil was reduced to 0.162 mg/kg, showing a removal efficiency of as high as 58.7%. Therefore, the removal of available cadmium by microsphere material prepared from the formamide-modified rectorite was 1.41 times higher than that of microsphere material prepared from the unmodified rectorite, indicating that the formamide-modified rectorite floatable 3D hollow microsphere material could more effectively remove the cadmium from soil. The formamide in the material showed a lower actual content (≤1.5%), and was cross-linked in the material and not easily released; meanwhile, the high recovery efficiency could also reduce the risk of secondary pollution in material applications.

Figure 6A:
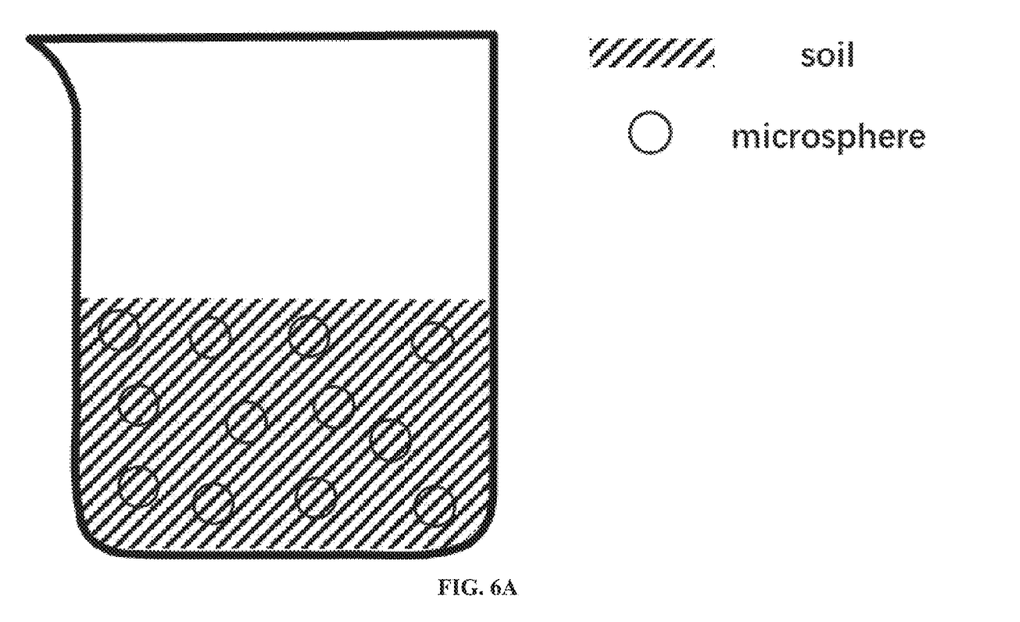
FIG. 6A is a schematic diagram before pouring water.
Figure 6B:
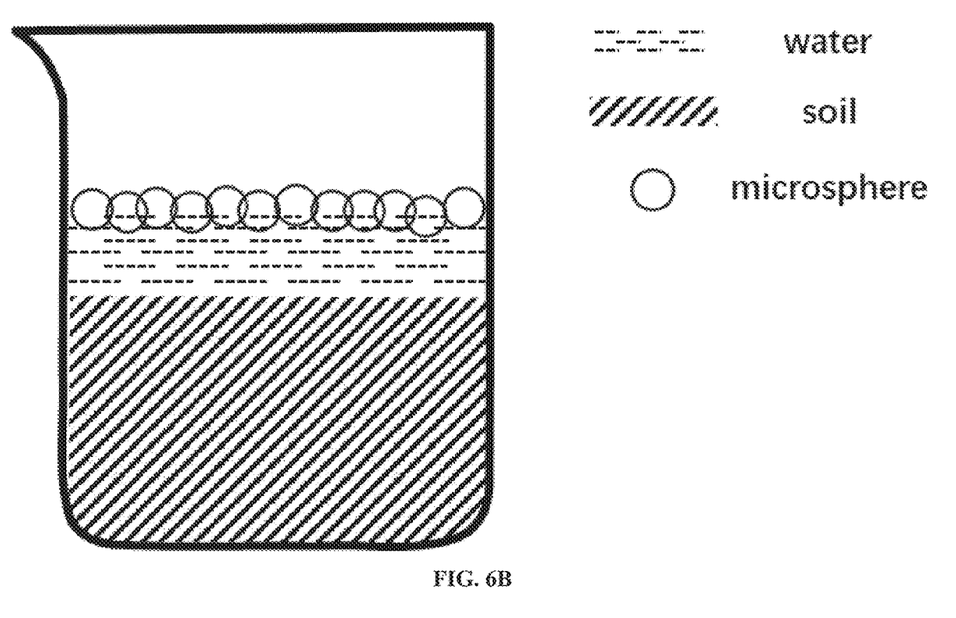
FIG. 6B is a schematic diagram after pouring water.

FIGS. 6A and 6B show a comparison before and after pouring water when the floatable 3D hollow microsphere material prepared in Example 2 was applied in soil. FIG. 6A shows a schematic diagram before pouring water, and FIG. 6B shows a schematic diagram after pouring water. As shown in FIGS. 6A and 6B, the floatable 3D hollow microsphere material floats on the surface after pouring water.

Example 3

50 g of rectorite was added to 500 mL of a sodium humate solution (8 g/L), and then stirred at 60° C. for 2 h; a resulting composite was washed with water 5 times and dried at 115° C. for 24 h, obtaining sodium humate-modified rectorite.

40 g of PVA and 0.9 g of sodium alginate were completely dissolved in a 100° C. water bath. After cooling slightly, 18 g of the sodium humate-modified rectorite, 0.3 g of EDTA, and 2 g of saponin were then added thereto, and the resulting mixture was stirred evenly, obtaining a viscous mixed solution. The viscous mixed solution was slowly added dropwise using an injection device (at a dripping rate of 1 g/min) into a boric acid/calcium chloride solution (the boric acid/calcium chloride solution was an aqueous solution of boric acid and calcium chloride, in which the boric acid was a saturated (i.e., 36.5 g/L), and a mass content of the calcium chloride was 10 g/L) to prepare a hollow microsphere. After leaving a resulting system to stand, a solid product was obtained, which was then washed, and dried at 50° C., obtaining a sodium humate-modified rectorite floatable 3D hollow microsphere.

Example 4

10 g of the sodium humate-modified rectorite floatable 3D hollow microsphere material prepared in Example 3 was added to 100 mL of deionized water (at a solid-to-liquid ratio of 1 g:10 mL), and a resulting system was ultrasonically modified at room temperature for 0.5 h (at a frequency of 20 kHz), and dried in a vacuum drying oven at 50° C., obtaining an ultrasonically-modified sodium humate-modified rectorite floatable 3D hollow microsphere material.

Use Example 2

(1) Use and Recycle of the Floatable 3D Hollow Microsphere Material 100 g of cadmium-contaminated dry soil (including total cadmium of 2.77 mg/kg and the available cadmium content of 0.392 mg/kg) was added into 50 mL of deionized water and stirred evenly. 0.63 g of the floatable 3D hollow microsphere material prepared in Example 3 or Example 4 was added thereto, and a resulting mixture was stirred thoroughly, and the resulting system was left to stand for different times to allow the material to absorb heavy metal elements. 45 mL of deionized water was then added thereto, followed by stirring. The material floating on the water surface was recovered through a filter and a recovery efficiency was calculated.

(2) Removal Effect of the Floatable 3D Hollow Microsphere Material on Cadmium in Soil The soil was collected after applying the floatable 3D hollow microsphere material prepared in Example 3 or 4, and the available cadmium content test was performed thereon. A removal efficiency of available cadmium in the soil by the floatable 3D hollow microsphere material was calculated by comparing with original soil sample. The results are shown in Table 4.

A concentration of available cadmium in the soil was measured using ICP-MS.

TABLE 3

Materials of Examples 3 to 4

| No. | Material |
|---|---|
| Example 3 | Sodium humate-modified rectorite floatable 3D hollow microsphere material |
| Example 4 | Ultrasonically-modified sodium humate-modified rectorite floatable 3D hollow microsphere material |

TABLE 4

Removal efficiency of available cadmium in soil by materials of Examples 3 to 4

| No. | Available cadmium content in soil after remediation (mg/kg) | Removal efficiency (%) |
|---|---|---|
| Example 3 | 0.217 | 44.6 |
| Example 4 | 0.147 | 62.5 |

The recovery efficiencies of the materials at 24 h after applying were in a range of 98.7% to 99.1%. After the application of the sodium humate-modified rectorite floatable 3D hollow microsphere material, the available cadmium content in the soil decreased from 0.392 mg/kg to 0.217 mg/kg, showing an available cadmium removal efficiency of 44.6%. However, after ultrasonic modification, the pore size distribution of the microsphere material was more uniform, the loaded sodium humate rectorite was more dispersed, and the specific surface area was increased, such that the adsorption capacity for heavy metal elements was improved. Therefore, after the application of the ultrasonically-modified sodium humate-modified rectorite floatable 3D hollow microsphere material, the available cadmium content in the soil was further reduced to 0.147 mg/kg, showing a removal efficiency of 62.5%, which was increased by 1.4 times compared with that of the microsphere material without ultrasonic modification. It was seen that the ultrasonic modification could increase an adsorption capacity of available cadmium by the floatable 3D-microsphere material, making the removal of cadmium more efficient.

Use Example 3

The formamide-modified rectorite floatable 3D hollow microsphere material prepared in Example 2 was selected to explore the recovery efficiency of the material after being applied to the soil for different times and the removal effect on available cadmium in the soil. The initial total cadmium content in the used soil was 2.77 mg/kg, and the available cadmium content was 0.392 mg/kg; an application time of the material was 0 h to 24 h, and other procedures were the same as those in Use Example 1. The results are shown in Table 5.

A concentration of available cadmium in the soil was measured using ICP-MS.

TABLE 5

Recovery efficiency of floatable 3D hollow microsphere material at different standing times after mixing and removal effect of available cadmium in soil

| Application time (h) | Recovery efficiency (%) | Available cadmium content in soil after remediation (mg/kg) | Removal efficiency of available cadmium in soil (%) |
|---|---|---|---|
| 0 | / | 0.392 | / |
| 4 | 98.2 | 0.246 | 37.2 |
| 12 | 98.9 | 0.219 | 44.4 |
| 24 | 99.5 | 0.162 | 58.7 |

As shown in Table 5, the recovery efficiency of the floatable 3D hollow microsphere material prepared in Example 2 of the present disclosure reached not less than 98% after applying for 4 h to 24 h. As the application time increased, the removal efficiency of available cadmium in the soil by the material prepared in Example 2 also gradually increased. At 24 h, the removal efficiency of available cadmium from the soil reached 58.7%. When the material was actually used, 24 h could be selected as an application time to ensure the recovery efficiency of the material and its reduction effect on available cadmium and total cadmium in the soil.

Use Example 4

The formamide-modified rectorite floatable 3D hollow microsphere material prepared in Example 2 was selected to explore the removal effect of the material on available cadmium in different soils. The initial total cadmium content in the soil used was 2.77 mg/kg, and available cadmium content was 0.392 mg/kg; an application time of the material was 24 h, and other procedures were the same as those in Use Example 1. The results are shown in Table 6.

A concentration of available cadmium in the soil was measured using ICP-MS.

TABLE 6

Removal effect of formamide-modified rectorite floatable 3D hollow microsphere material on available cadmium in different soils

| Soil pH | Total cadmium in soil (mg/kg) | Available cadmium in soil before remediation (mg/kg) | Available cadmium in soil after remediation (mg/kg) | Removal efficiency of available cadmium in soil (%) |
|---|---|---|---|---|
| 5.57 | 2.77 | 0.392 | 0.162 | 58.7 |
| 5.34 | 1.49 | 0.271 | 0.105 | 61.3 |
| 5.39 | 0.56 | 0.112 | 0.040 | 64.3 |

The recovery efficiency of the floatable 3D hollow microsphere material was in a range of 98% to 100% when applied to different soils for 24 h. As shown in Table 6, when the initial available cadmium content in the soil was 0.112 mg/kg to 0.392 mg/kg, the formamide-modified rectorite floatable 3D hollow microsphere material had a removal efficiency of available cadmium ranging from 58.7% to 64.3%. This indicated that the material of the present disclosure had an efficient cadmium removal effect on soils with different acidities and cadmium contents. It was found that the material exhibited a higher cadmium removal efficiency for low-cadmium-contaminated soils than that of high-cadmium-contaminated soils. This might be due to that the material has a limited adsorption capacity and the adsorption saturation was reached earlier in high-cadmium soils, thereby resulting in a reduced removal efficiency.

Use Example 5

The formamide-modified rectorite floatable 3D hollow microsphere material prepared in Example 2 was selected to explore the removal efficiency of available cadmium by the material with different dosages. The initial total cadmium content in the used soil was 2.77 mg/kg, and available cadmium content was 0.392 mg/kg; an application time of the material was 24 h, and other procedures were the same as those in Use Example 1. The results are shown in Table 7.

A concentration of available cadmium in the soil was measured using ICP-MS.

TABLE 7

Removal efficiency of available cadmium by the formamide-modified rectorite floatable 3D hollow microsphere material with different dosages efficiency

| Material dosages (kg/mu) | Recovery efficiency/% | Available cadmium in soil after remediation (mg/kg) | Removal efficiency of available cadmium in soil (%) |
| --- | --- | --- | --- |
| 500 | 99.4 | 0.186 | 52.6 |
| 1000 | 99.0 | 0.162 | 58.7 |
| 1500 | 99.0 | 0.113 | 71.2 |

The recovery efficiency of the floatable 3D hollow microsphere material was in a range of 98% to 100% when applied to different soils for 24 h. As shown in Table 7, when the material dosage was in a range of 500 kg/mu to 1,500 kg/mu, the removal efficiency of available cadmium was ranging from 52.6% to 71.2%. As the dosage of material increased, the removal efficiency of available cadmium also increased. This showed that increasing the dosage of material could improve the removal efficiency of available cadmium. When applied at a dosage of 1,500 kg/mu, the available cadmium removal efficiency of the material from the soil was 71.2%, which was 1.35 times the available cadmium removal efficiency at a dosage of 500 kg/mu.

Use Example 6

The formamide-modified rectorite floatable 3D hollow microsphere material prepared in Example 2 was selected to explore the removal efficiency of available cadmium by the material when applied multiple times. The initial total cadmium content in the used soil was 2.77 mg/kg, and the available cadmium content was 0.392 mg/kg; an application time of the material was 24 h, and other procedures were the same as those in Use Example 1. The results are shown in Table 8.

A concentration of available cadmium in the soil was measured using ICP-MS.

TABLE 8

Removal effect of the formamide-modified rectorite floatable 3D hollow microsphere material when applied consecutively for 3 times on available cadmium in soil

| Number of application times | Recovery efficiency/% | Available cadmium in soil after remediation (mg/kg) | Removal efficiency of available cadmium in soil (%) |
| --- | --- | --- | --- |
| 1 | 99.4 | 0.162 | 58.7 |
| 2 | 99.2 | 0.049 | 87.5 |
| 3 | 99.1 | 0.025 | 93.6 |

The recovery efficiency of the floatable 3D hollow microsphere material was in a range of 98% to 100% when applied to different soils for 24 h. As shown in Table 8, when the number of application times of the material was increased, the removal efficiency of available cadmium by the material also increased. When the material was applied 3 times, the removal efficiency of available cadmium in the soil by the material reached 93.6%. This showed that multiple applications of the material could significantly improve its removal performance on available cadmium. When the material was applied 3 times, the removal efficiency of total cadmium by the material also reached 13.3%. After three consecutive applications of the material, more than 90% of the available cadmium in the soil was removed. Due to the dynamic change of cadmium forms in soil, some other forms of cadmium might be converted into available cadmium after a period of time. Therefore, the slack time before sowing and transplanting or after harvesting could be used to apply the material multiple times, which could not only reduce the available cadmium in soil in that season, but also achieve a desired effect of total cadmium removal.

Meanwhile, a treatment without adding the material was also set up, and the pouring and draining were the same as those in Use Example 6. The cadmium content in the discharge water during drainage was measured, a cadmium content in the discharge water ranged from 0.0004 mg/L to 0.004 mg/L, which was lower than the cadmium limit of 0.01 mg/L according to the farmland irrigation water quality standard (GB5085-2021), and did not cause secondary pollution. Moreover, only 0.0054 mg/kg Cd in the soil was reduced by draining soil three times, such that the cadmium removed by draining had almost little impact on the total cadmium in soil.

After application in the soil, the material was recovered, and regenerated through backwashing, thereby realizing the recycle of the material.

Figure 7:
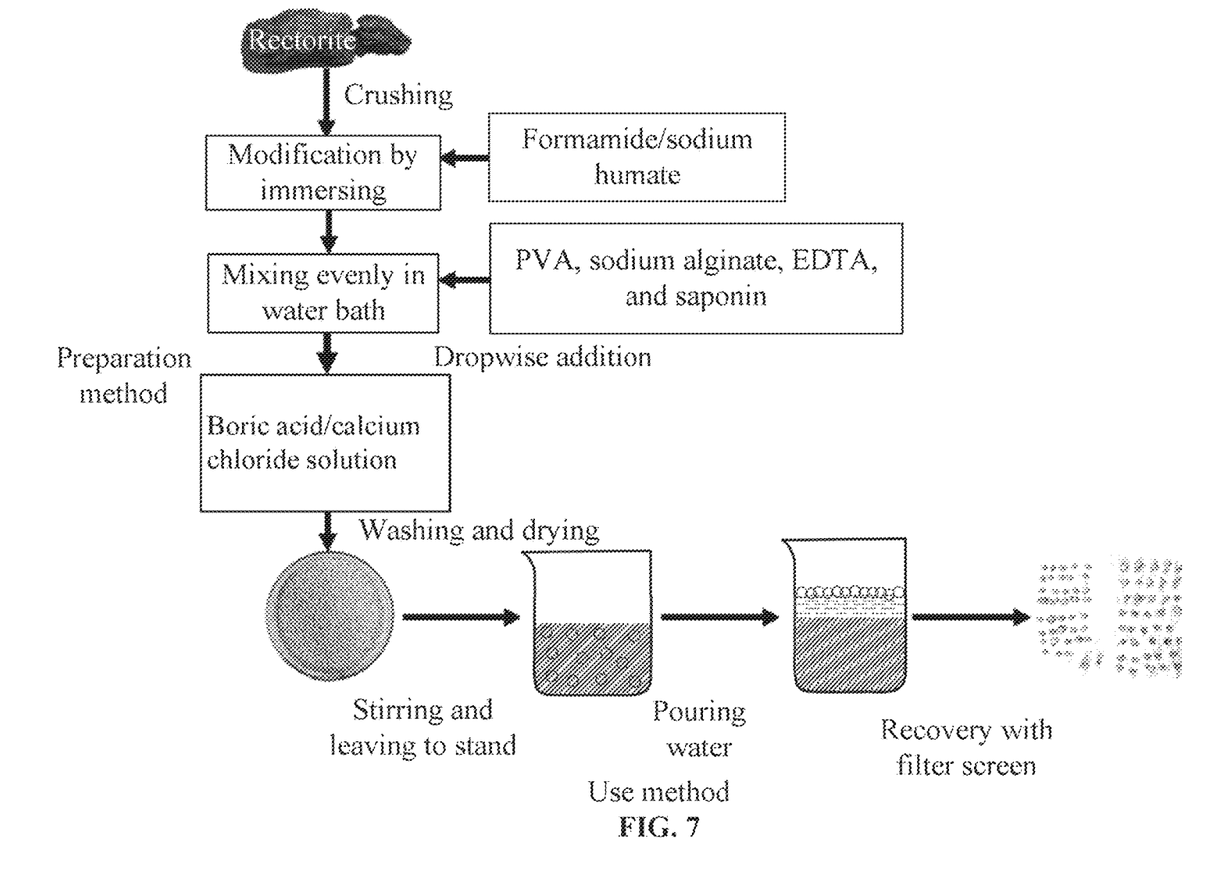
FIG. 7 shows a flow chart of the preparation and use of the floatable 3D hollow microsphere material according to an embodiment of in the present disclosure.

In addition, the floatable 3D hollow microsphere material according to the present disclosure was also suitable for use in wastewater containing heavy metal elements such as cadmium, or for the removal of heavy metal elements in farmland irrigation water. In summary, it was seen that the floatable 3D hollow microsphere material according to the present disclosure could efficiently remove heavy metal elements in soil. FIG. 7 shows a flow chart of the preparation and use of a floatable 3D hollow microsphere material according to an embodiment of the present disclosure. In the above examples, cadmium was taken as an example, and the use included applying the material to a surface of a moist soil, conducting stirring or rotary tillage to make the material evenly distributed; after leaving to stand, pouring water to float the material after adsorbing heavy metal elements, and recovering the material with a filter or a filter screen set at a drainage outlet, and removing from the moist soil. In addition to being able to efficiently adsorb heavy metal elements, the material has a low density and is floatable on the water, and shows a moderate diameter that is convenient for collection and removal directly with a filter, which is simple in operations and low in cost. Relevant results show that the removal efficiency of available cadmium in soil by the material reaches 93.6%. The floatable 3D hollow microsphere material according to the present disclosure has less expense and a short time limit for farmland soil remediation, could reduce a total content of heavy metal elements, and do not disturb normal agricultural operations.

Although the present disclosure is described in detail in conjunction with the foregoing examples, they are only a part of, not all of, the examples of the present disclosure. Other examples could be obtained based on these examples without creative efforts, and all of these examples shall fall within the scope of the present disclosure.

What is claimed is:

1. A method for preparing a floatable three-dimensional (3D) hollow microsphere material, comprising the steps of
    mixing polyvinyl alcohol (PVA), sodium alginate, ethylenediaminetetraacetic acid (EDTA), saponin, and at least one of modified rectorite and unmodified rectorite, to obtain a mixed material, wherein the modified rectorite comprises at least one selected from the group consisting of formamide-modified rectorite and sodium humate-modified rectorite; and
    mixing the mixed material with a cross-linking agent solution, and performing cross-linking on a resulting mixture, to obtain the floatable 3D hollow microsphere material.

2. The method as claimed in claim 1, wherein the modified rectorite is prepared by a process comprising
    mixing rectorite with a modifier solution, and performing modification, to obtain the modified rectorite, wherein the modifier solution comprises a formamide solution or a sodium humate solution.

3. The method as claimed in claim 2, wherein the rectorite has a particle size of less than or equal to 0.149 mm.

4. The method as claimed in claim 2, wherein the formamide solution has a formamide mass percentage of 20% to 25%; and
    under the condition that the modifier solution is the formamide solution, a ratio of a mass of the rectorite to a volume of the formamide solution is in a range of (1-2) g:10 mL.

5. The method as claimed in claim 3, wherein the formamide solution has a formamide mass percentage of 20% to 25%; and
    under the condition that the modifier solution is the formamide solution, a ratio of a mass of the rectorite to a volume of the formamide solution is in a range of (1-2) g:10 mL.

6. The method as claimed in claim 2, wherein the sodium humate solution has a sodium humate mass concentration of 8 g/L to 10 g/L; and
    under the condition that the modifier solution is the sodium humate solution, a ratio of a mass of the rectorite to a volume of the sodium humate solution is in a range of (1-2) g:20 mL.

7. The method as claimed in claim 3, wherein the sodium humate solution has a sodium humate mass concentration of 8 g/L to 10 g/L; and
    under the condition that the modifier solution is the sodium humate solution, a ratio of a mass of the rectorite to a volume of the sodium humate solution is in a range of (1-2) g:20 mL.

8. The method as claimed in claim 1, wherein a mass ratio of the PVA, the sodium alginate, at least one of the modified rectorite and the unmodified rectorite, the EDTA, and the saponin is in a range of (175-225):(2-10):(50-125):(1-5):(5-20).

9. The method as claimed in claim 1, wherein the cross-linking agent solution comprises boric acid, calcium chloride, and water;
    the cross-linking agent solution has a boric acid mass concentration of 30 g/L to 40 g/L and a calcium chloride mass concentration of 5 g/L to 15 g/L; and
    a mass ratio of the mixed material to the cross-linking agent solution is in a range of (46-77):(1035-1055).

10. The method as claimed in claim 8, wherein the cross-linking agent solution comprises boric acid, calcium chloride, and water;
    the cross-linking agent solution has a boric acid mass concentration of 30 g/L to 40 g/L and a calcium chloride mass concentration of 5 g/L to 15 g/L; and
    a mass ratio of the mixed material to the cross-linking agent solution is in a range of (46-77):(1035-1055).

11. A floatable 3D hollow microsphere material prepared by the method as claimed in claim 1, comprising
    a hollow cross-linked polymer microsphere obtained by cross-linking the PVA with the sodium alginate; and
    the EDTA, the saponin, and at least one of the modified rectorite and the unmodified rectorite, each being loaded inside the hollow cross-linked polymer microsphere,
    wherein the modified rectorite comprises at least one selected from the group consisting of the formamide-modified rectorite and the sodium humate-modified rectorite.

12. The floatable 3D hollow microsphere material as claimed in claim 11, wherein the floatable 3D hollow microsphere material has a diameter of 2 mm to 10 mm, and a density of 0.45 g/cm$^3$ to 0.5 g/cm$^3$.

13. A method for removing heavy metal elements in soil, comprising
    applying the floatable 3D hollow microsphere material as claimed in claim 11 to soil for adsorbing the heavy metal elements;
    floating the floatable 3D hollow microsphere material by pouring water to soil; and
    recovering the floatable 3D hollow microsphere material.

* * * * *